Patented Oct. 13, 1953

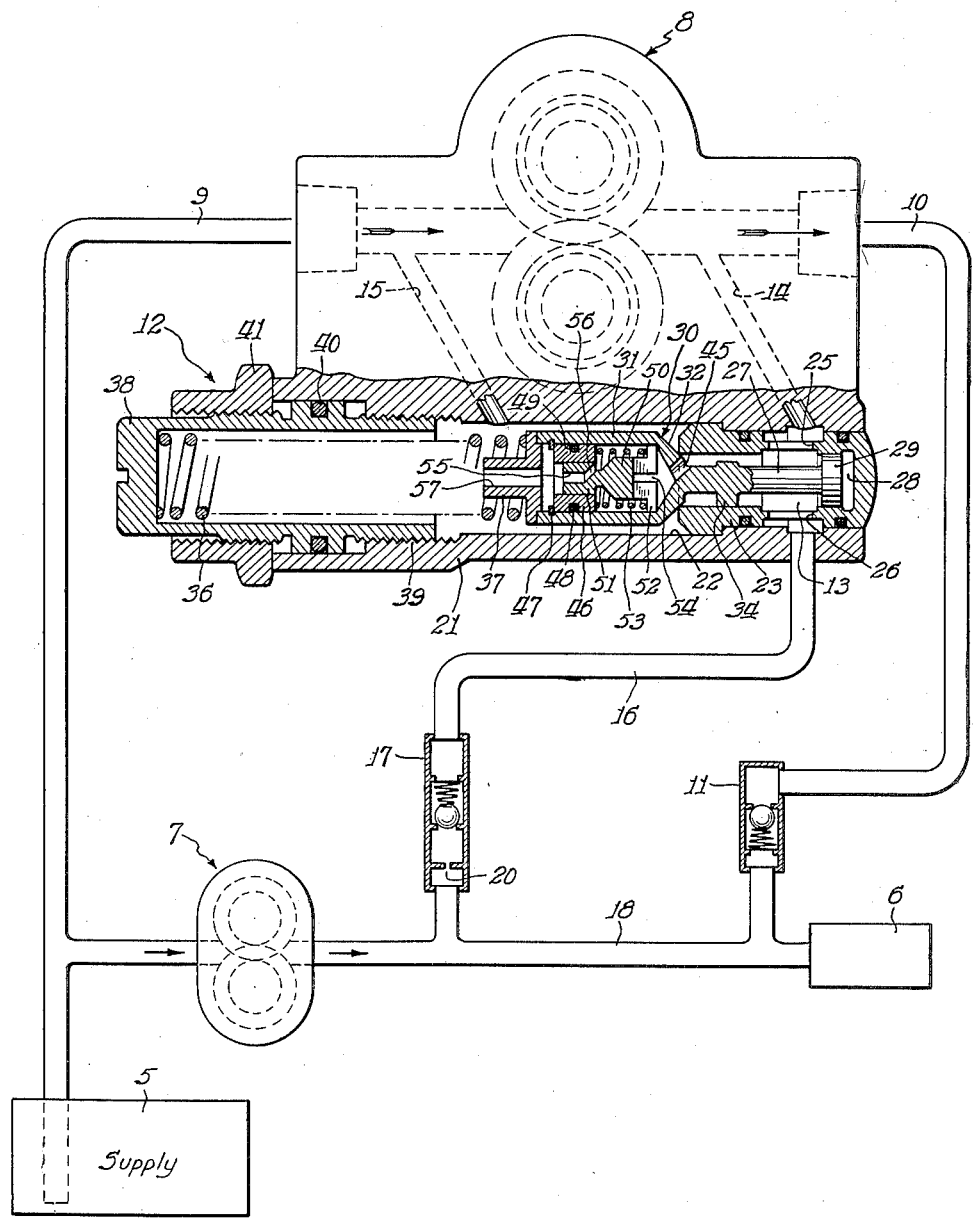

2,655,111

UNITED STATES PATENT OFFICE 2,655,111

FLUID CIRCULATING ARRANGEMENT FOR HYDRAULIC PRESSURE SYSTEMS

Ernest H. Schanzlin, Cleveland, Ohio, assignor to Borg-Warner Corporation, Chicago, Ill., a corporation of Illinois Application December 29, 1948, Serial No. 67,806

7 Claims. (Cl. 103—11)

This invention relates to a fluid control system and more particularly to a novel form of fluid circulating arrangement for a hydraulic pressure system.

While the present invention is adapted for application in many and various uses, as will be evident from the following description, this invention is particularly suited for use in aircraft fluid control systems where the problem of oil congealment is especially acute and the invention is therefore illustrated and described as applied in a fluid control system for adjusting the pitch of an aircraft propeller.

In certain types of aircraft the propeller pitch is automatically adjusted by varying the oil pressure on a control piston associated with the propeller. Normally, this oil pressure is supplied from a pump driven from the aircraft engine, the pressure supplied being controlled through a suitable governor and distributor valve arrangement, well known in the art. Since it is desirable to provide a mechanism for feathering the propeller in the event of engine failure and consequent non-operation of the engine driven pump, one practice is to provide a second pump which may be electrically driven, and which is operable independently of the operation of the aircraft engine. It has been found in practice that because this second pump is operated only intermittently, and indeed ordinarily is operated only under emergency conditions, the oil in the second pump and associated lines may thicken and congeal due to cold and thus prevent the pump from operating effectively. Furthermore, the relief valve associated with the second pump being also infrequently operated and being subject to the same cold as the pump may fail to operate at the required pressure due to thickening of the oil therein with consequent damage to the system.

An object of the present invention is to provide a new and effective fluid control system so arranged as to prevent disabling of the system due to thickening or congealment of the oil.

Another object of the present invention is to provide a fluid control system wherein a sufficient circulation of oil through the system is provided in the normal operation thereof to prevent congealment of the oil.

A further object of the present invention is to provide a relief valve of improved design having a by-pass arrangement permitting circulation of fluid therethrough at a low pressure, but arranged so as to seal the by-pass at a flow level substantially less than that required to open the relief valve.

In accordance with one embodiment of this invention a fluid control system may be provided incorporating a primary pumping circuit having a normally operative pump connected to a fluid supply and a utilization device, and an auxiliary circuit including a second pump connected to the same fluid supply and to the utilization device and ordinarily operative only upon failure of the first pump. The system includes means for diverting a portion of the fluid flow from the normally operative pump into the auxiliary pumping circuit to maintain a small flow of fluid through the auxiliary pumping circuit. The system also includes a relief valve associated with the second pump and having a by-pass passage therethrough permitting flow of fluid at a low rate but arranged to close upon actuation of the second pump to prevent loss of pressure.

Other objects and advantages of the present invention will be apparent from the following detailed description taken in conjunction with the drawing wherein the single figure is a schematic representation of a fluid control system in accordance with this invention, the relief valve being shown in axial section.

The fluid control system shown in the drawing is arranged to supply oil under pressure from a supply tank 5 to a utilization device 6, which may be the pitch control mechanism of an aircraft propeller. In the normal operation of this system, the fluid pressure is provided by a pump 7 which may be driven by the aircraft engine (not shown). In the event of non-operation of the aircraft engine and consequent non-operation of the pump 7, fluid pressure may be supplied from a secondary or auxiliary pumping circuit comprising a pump 8 connected to the supply tank 5 by a conduit 9 and connected to the utilization device 6 by a second conduit 10. This second pump 8 is intended to be operated independently of the operation of the aircraft engine and may be thus operated by an electric motor (not shown). A check valve 11 may be connected in the conduit 10 to prevent application of oil pressure from the pump 7 to the pump 8 through the conduit 10. This check valve may of course be eliminated where connection is made directly to the utilization device 6 and not through conduit 18, which connects the pump 7 to the device 6. It may also be eliminated where it is desired to permit pressure to be supplied to the pump 8 from the pump 7 to establish a back flow through the pump 8. This latter arrangement is particularly desirable where the pump 8 is of the pressure loaded type and consequently permits a relatively large back flow around the bearings when pressure is not applied thereto. Under such circumstances the oil from the supply tank 5, which is usually the oil supply of the engine and is consequently hot, will prevent freezing of the oil in the pump 8 and associated conduits 9 and 10. On the other hand, the loss of pressure due to leakage through the pump 8 when in non-operating condition may be difficult to control and sufficiently great to represent a substantial decrease in efficiency in the primary pumping circuit comprising the pump 7. In such case the check valve 11 is desirable.

In accordance with usual practice, the pump 8 has associated therewith a relief valve 12 which is arranged, in well known manner, to open at a predetermined pressure level to prevent damage to the system. In the embodiment illustrated a passage 14 is provided in the pump 8 and extends from the discharge side of the pump 8 to the inlet chamber 13 of the relief valve. A second passage 15 extends from the discharge side of the relief valve to the inlet side of the pump 8 so as to discharge into the conduit 9 and back to the supply tank 5.

Because the relief valve 12 is required to operate only infrequently, the oil therein may congeal due to cold and thus when the pressure from the pump 8 exceeds the predetermined, desired level, the relief valve may fail to operate, with consequent damage to the system. In accordance with this invention, congealing of the oil in the relief valve is prevented by maintaining, during the normal operation of the fluid control system, a definite circulation of hot engine oil from the supply 5 through the relief valve. Thus, a conduit 16 has one end connected to the inlet chamber 13 of the relief valve and the other end connected through a check valve 17 to the conduit 18 which connects the pump 7 to the utilization device 6, the conduit 16 being thus connected to the discharge side of the pump 7. The check valve 17 has a restricted orifice 20 adjacent its inlet end, that is, the end connected to the conduit 18, whereby a fractional part of the fluid flow through the conduit 18 is diverted into the conduit 16, the check valve 17 being arranged to permit flow in the direction from the conduit 18 to the relief valve 12 but to prevent flow in reverse direction.

Referring now specifically to the relief valve construction of this invention, it will be seen from the drawing that the relief valve comprises an elongated housing 21 suitably secured to the pump 8 and having a cylindrical bore 22. A combination valve seat and dash pot sleeve 23 is located in the right end portion of the bore 22, as viewed in the drawing, and is provided with suitable apertures 25 and 26, adjacent the right end of the sleeve 23 and on opposite sides thereof, the apertures 25 and 26 communicating with the passage 14 and the conduit 16, respectively. The right end of the sleeve 23 is closed to form a dash pot chamber 28 in which is journaled a piston 29 formed at the right end of a stem 27 of relief valve 30. The particular construction and operation of this dash pot feature of the relief valve forms no part of the present invention and is described in more detail in U. S. Patent No. 2,351,512 to Ray G. Holt, issued June 13, 1944.

The relief valve 30 includes a tubular body portion, indicated at 31, which tapers sharply at 32 to form the valve disc portion which seats on the left end of the combination valve seat and dash pot cylinder 23. The tapered portion 32 has integrally formed therewith the stem 27 to the right end of which is fixed the dash pot piston 29. Intermediate the piston 29 and the tapered portion 32 are a plurality of radially extending spokes 34 which maintain the alignment of the valve 30 while permitting passage of fluid to the left through the relief valve inlet chamber 13. The relief valve 30 is held normally closed by a helically coiled spring 36 positioned within the left portion of the bore 22, the right end of the spring 36 bearing against a spring guide 37 seated on the left end of the tubular portion 31 of the relief valve 30. The left end of the spring 36 is received in an elongated adjusting cap 38, the body portion of which extends into and engages a suitably threaded portion 39 of the bore 22. Sealing ring 40 is associated with the cap 38 to prevent leakage and a locking nut 41 is threaded on the left portion of the periphery of the cap 38 to secure the cap in position after the required spring pressure has been established by threading the cap into or out of the bore 22. When the pressure on the inlet side of the relief valve exceeds the oppositely directed pressure of the spring 36, the relief valve will open provided the oil therein has not thickened so much as to prevent movement of the valve 30 at this pressure.

In accordance with this invention, a by-pass path is provided through the relief valve from the inlet end thereof to the discharge end, this path being maintained normally open to permit a passage of fluid through the relief valve, the fluid being supplied from the pump 7 through conduit 16. It will be noted that the inwardly tapered portion 32 forming the valve disc has formed therein a small aperture 45 which extends from the inlet chamber side of the relief valve 30 to the interior of the cylindrical body portion 31 thereof. Within this cylindrical body portion 31 is located a normally open check valve assembly including a sleeve-like valve seat 46 which is retained in the cylindrical portion 31 by a split-ring 47 positioned at the left end thereof and which is sealed to the inner wall of the cylindrical body portion by a packing washer 48 received in an annular groove 49 formed in the periphery of the valve seat. A valve 50 of generally cylindrical form is associated with the valve seat 46 and located in the cylindrical body portion 31 of relief valve 30, being slidably supported therein at its left end by an integrally formed, reduced portion 51 thereof journaled within the sleeve 46, and at its right end by an integrally formed flanged portion 52. The valve 50 is resiliently held away from the seat 46 by a helical spring 53, the left end of which bears against the right side of the sleeve 46 and the right end of which bears against the left side of the flanged portion 52 of the valve 50. It will be noted that the flanged portion 52 has formed in the periphery thereof a transversely extending groove 54 and having a depth greater than the thickness of the flanged portion 52. A plurality of such grooves may be formed in the periphery of the flange 52 and cooperate to provide a plurality of passages through the flanged portion of the valve 50. A second passage is formed by a centrally disposed aperture 55 in the reduced portion 51 of the valve 50 and an angularly extending aperture 56 connected thereto and extending to the right therefrom.

When the check valve is in its normally open position, as shown, the entrance to the aperture 56 is open. When the check valve closes by seating against the sleeve 46, the entrance to the aperture 56 is closed also.

From the foregoing it will be evident that in the normal operation of this fluid control system there exists a passage from the discharge side of the normally operating pump 7 through the orifice 20, the check valve 17 and the conduit 16 to the inlet side of the relief valve 12. From the inlet chamber 13 of the relief valve 12, a further passage is provided through the aperture 45, the grooves 54, the annular chamber defined by the inside wall of the cylindrical body portion 31 and the periphery of the valve 50, and the passage formed by the connecting apertures 55 and 56 formed in the reduced left portion 51 of the valve 50. This last passage connects through an axially extending aperture 57 formed in the spring retaining member 37 to the discharge passage 15 of the relief valve, this discharge passage 15 connecting in turn with the conduit 9 which leads to the supply tank 5. It will be evident also that a certain amount of fluid pressure supplied from the pump 7 through the conduit 16 to the inlet chamber of the relief valve 12 is applied through the passage 14 to the discharge side of the normally non-operating pump 8. Such leakage as may exist in this pump may be utilized to provide a circulatory path back through the pump from the discharge to the inlet side and therefrom back to the tank 5.

Upon actuation of the pump 8, the check valve 50 immediately closes due to the increased flow through the orifice 45 in the disc 32 of the relief valve, the spring 53 associated with the valve 50 being selected to provide only sufficient pressure to hold the valve open against a small flow such as provided by the pump 7 and diverted through the orifice 20. Closing of relief valve 50 prevents loss of pressure during the operation of pump 8. At the same time, the check valve 17 closes and the check valve 11 opens permitting flow of fluid through the conduit 10 from the pump 8 to the utilization device 6.

Upon the pressure supplied by the pump 8 exceeding a predetermined level, the relief valve 12 opens, that is the valve 30 moves to the left away from the valve seat 23 against the pressure of the spring 36. This permits the pump 8 to discharge through the relief valve back into the suction line 9 connected to the tank 5. The discharge path from the inlet chamber 13 includes the annular chamber defined by the periphery of the body portion 30 and the inner wall of the housing 21, that is, the bore 22, and the discharge passage 15, which connects to the inlet side of the pump 8.

It will be evident from the foregoing that in accordance with this invention, in the normal operation of the fluid supply system a small amount of oil is constantly circulated through the auxiliary pump 8, relief valve 12, and associated connecting lines. By properly selecting the diameter of the orifice 20 with respect to the pressure supplied by the pump 7, this circulatory flow may be made sufficient to avoid any danger of oil congealing in the less frequently used auxiliary pumping circuit. At the same time loss of pressure due to provision of this circulating arrangement is held to a minimum in the case of the primary pumping circuit and actually substantially eliminated where the pump 8 is operated.

Where herein the various elements of the structure disclosed have been referred to as being located in a right or a left position, it will be understood this is done solely for the purpose of facilitating description and such references relate only to the respective positions of the parts as shown in the drawing.

While this invention has been shown and described in conjunction with a fluid flow control system for aircraft, it will be understood that it is not limited to such application and that many changes and modifications may be made in the structure disclosed without departing from the spirit or scope of the present invention.

I claim:

1. In a fluid control system including a fluid supply, a first pump connected to said supply, a positive displacement type pump connected to said supply and arranged to be operable in the event of non-operation of the first pump, said positive displacement pump being of the type allowing some reverse flow of fluid under pressure when said pump is not operating, and by-pass means for circulating back through said positive displacement type pump a fractional quantity of the fluid supplied by said first pump during operation of said first pump.

2. In a fluid control system, a fluid supply, a primary pumping circuit including a first pump connected to said fluid supply, an auxiliary pumping circuit including a second positive displacement type pump connected to said fluid supply, and means for diverting a portion of the fluid flow from the primary pumping circuit into said auxiliary pumping circuit to maintain a flow of fluid through said secondary pumping circuit.

3. A fluid control system in accordance with claim 2 wherein said diverting means includes a conduit having one end connected in said primary pumping circuit and the other end connected in the auxiliary pumping circuit, said conduit having a restricted orifice at the end connected to the primary pumping circuit to cause diversion of only a fractional part of the fluid delivered by the first pump.

4. A fluid control system in accordance with claim 2 wherein said diverting means includes a conduit having one end connected in said primary pumping circuit and the other end connected in the auxiliary pumping circuit, said conduit having a restricted orifice at the end connected to the primary pumping circuit to cause diversion of only a fractional part of the fluid delivered by the first pump, and a check valve adjacent said orifice effective to prevent fluid flow from the auxiliary pumping circuit through said orifice.

5. A fluid control system according to claim 2 wherein a relief valve is associated with said second pump and connected to discharge into said fluid supply, and means associated with said relief valve for permitting a restricted flow of fluid through said relief valve at a pressure less than that developed by the second pump.

6. A fluid control system according to claim 2 wherein a relief valve is associated with said second pump and connected to discharge into said fluid supply, valve means associated with said relief valve for permitting a restricted flow of fluid through said relief valve at a pressure less than that developed by said second pump, said valve means being arranged to close upon actuation of said second pump tending to create an increased flow through said relief valve.

7. A fluid circulating arrangement for a hydraulic pressure system of the type including a fluid supply, a primary pump connected to deliver fluid from said supply and a secondary or standby pump of the positive displacement type connected for delivering fluid from said supply in the event of non-operation of said first pump, said standby pump being of the type permitting reverse flow of liquid under pressure therethrough when said standby pump is not being operated, said circulating arrangement including means for diverting a portion of the fluid flow from the primary pump into the auxiliary pump to cause a reverse flow of a fractional quantity of the fluid supplied by said first pump through said secondary or standby pump whereby congealing of the fluid in said standby pump is minimized.

ERNEST H. SCHANZLIN.

References Cited in the file of this patent

UNITED STATES PATENTS

| Number | Name | Date |
|---|---|---|
| 1,897,432 | Klotzman | Feb. 14, 1933 |
| 2,211,370 | Ernst et al. | Aug. 13, 1940 |
| 2,243,364 | Trautman | May 27, 1941 |
| 2,255,560 | Fieber et al. | Sept. 9, 1941 |
| 2,312,877 | Campbell | Mar. 2, 1943 |
| 2,366,388 | Crosby | Jan. 2, 1945 |
| 2,420,890 | MacDuff | May 20, 1947 |
| 2,532,856 | Ray | Dec. 5, 1950 |